United States Patent [19]

Kubota et al.

[11] Patent Number: 4,806,809

[45] Date of Patent: Feb. 21, 1989

[54] ROTARY SHAFT COUPLING DEVICE

[75] Inventors: Kazuhisa Kubota; Hisashi Hirose; Takao Sakakibara; Yasuo Miyake; Sinzi Mizutani, all of Aichi, Japan

[73] Assignee: Kabushiki Kaisha Tokai Rika Denki Seisakusho, Aichi, Japan

[21] Appl. No.: 59,612

[22] Filed: Jun. 8, 1987

[30] Foreign Application Priority Data

Jun. 12, 1986 [JP] Japan .............................. 61-089960[U]
Jul. 29, 1986 [JP] Japan .............................. 61-116460[U]

[51] Int. Cl.4 .......................... H02K 7/00; F16D 1/10
[52] U.S. Cl. .................................. 310/75 D; 464/52; 464/57
[58] Field of Search .................. 310/75 D, 78, 42; 324/163, 174; 464/52, 53, 57, 58

[56] References Cited

U.S. PATENT DOCUMENTS 1,914,928  6/1933  Scott ...................................... 464/53
4,575,356  3/1986  Murohushi et al. ................... 464/52

Primary Examiner—Patrick R. Salce
Assistant Examiner—D. L. Rebsch
Attorney, Agent, or Firm—Finnegan, Henderson, Farabow, Garrett, & Dunner

[57] ABSTRACT

A device for coupling two rotary shafts, wherein a guide member is used on the coupling end of a first shaft to guide a coupling protrusion on the coupling end of a second shaft into a V-shaped coupling recess on the first shaft. The guide member can be made of a resilient plastic, to provide a flexible and detachable coupling member and reduce abnormal wear of the rotary shaft.

9 Claims, 3 Drawing Sheets

ROTARY SHAFT COUPLING DEVICE

FIELD OF THE INVENTION

The present invention relates to a rotary shaft coupling device and particularly, to such a device designed to inductively rotate one of the shafts to a coupling position when a first shaft and a second shaft are fitted together and coupled.

BACKGROUND OF THE INVENTION

In an automobile, for instance, a speed sensor is installed between a driven gear of a transmission and a speedometer cable to transmit a car speed signal to a transmission control computer. In some devices, the speed signal has been utilized to initiate the operation of an automatic door lock.

The rotary shaft of the speed sensor is typically divided into a first rotary shaft and a second rotary shaft. The former is equipped with a flat coupling protrusion extending from the coupling end thereof, and the latter is provided with a coupling recess in the form of a slit in the end thereof. The aforesaid arrangement permits transmitting the rotary power of the first rotary shaft to the second rotary shaft as a result of fitting the coupling protrusion into the coupling recess. Further, the second rotary shaft is equipped with a permanent magnet for detecting the rotation that results from the first rotary shaft's being coupled to the driven gear. Moreover, the first rotary shaft is allowed to rotate in an eccentric state relative to the second rotary shaft.

When the speed sensor is being fitted to the transmission, the first rotary shaft is first coupled to the driven gear and, simultaneously the coupling protrusion of the first rotary shaft is fitted into the coupling recess of the second rotary shaft.

In order to couple the shafts in the aforesaid conventional arrangement, however, the rotational position of the coupling protrusion must be adjusted to register with the coupling recess, because the driven gear, i.e., the first shaft, is fixed and not rotatable. A disadvantage of such a conventional arrangement is that such coupling requires time and effort.

SUMMARY OF THE INVENTION

An object of the present invention is to provide a rotary shaft coupling device capable of eliminating the need to register the rotational positions of a first rotary shaft coupling protrusion and a received rotary shaft coupling recess and thereby improve the efficiency of the coupling operation.

Another object of the present invention is to provide an improved detector for detecting the number of revolutions, which detector is not subject to abnormal wear even though a rotary shaft is fitted to a stator case in an eccentric, i.e., an off-center, state.

The rotary shaft coupling device according to the present invention comprises a first rotary shaft having a coupling end and a coupling protrusion extending from the coupling end, a second rotary shaft having a coupling end and a coupling recess in the coupling end to receive the coupling protrusion, and a V-shaped guide means on the coupling end of the second rotary shaft where the coupling recess is formed, the guide means having opposing inner faces tilted with respect to the axis of the second rotary shaft so as to lead the coupling protrusion into the coupling recess.

When the first and second rotary shafts are coupled, a flat coupling protrusion of the first rotary shaft is led by the guide means and fitted into the coupling recess of the second rotary shaft. Consequently, it becomes unnecessary to adjust the rotational positions of the coupling protrusion and recess during the coupling operation.

Further, the rotary shaft coupling device according to the present invention is characterized in that a resilient cylindrical member is attached to the coupling end of the second rotary shaft so as to cover the portion where the first and second rotary shafts are fitted and coupled to each other. A radially-extending mating projection is formed in the inner periphery of the coupling end of the cylindrical member, and a stopper recess for receiving the mating projection is formed in the outer periphery of the first rotary shaft opposite to the mating projection.

When the second rotary shaft is fitted and coupled to the first rotary shaft coupled to a rotary body, the speed of which is being measured, both the rotary shafts can be flexibly coupled, even though the first rotary shaft is eccentric relative to the axis of the stator case and the second rotary shaft is aligned in the stator case. Accordingly, the second rotary shaft that is rotatably installed in the stator case or the bearing thereof is prevented from abnormally wearing off. Moreover, since the mating projection of the cylindrical member is fitted into an annular recess on the first shaft while both the rotary shafts are coupled, the first rotary shaft is prevented from falling off during assembly.

DETAILED DESCRIPTION OF THE INVENTION

Figure 1:
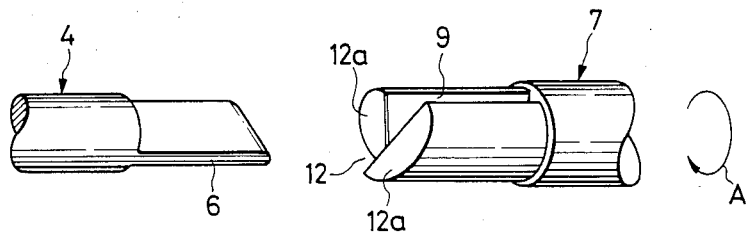
FIG. 1 is view of the coupling ends of the first and rotary shafts employed in a first embodiment of the present invention.
Figure 2:
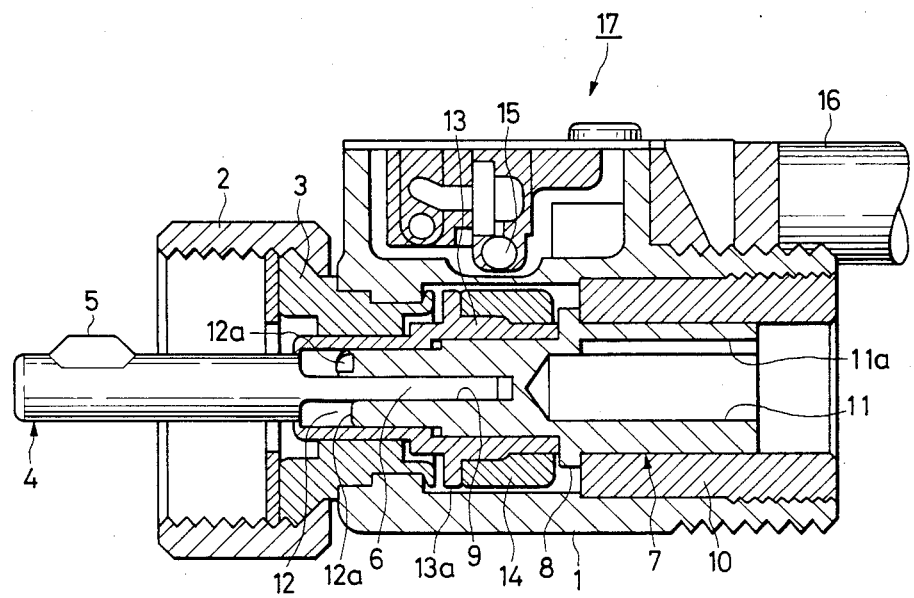
FIG. 2 is a sectional view a speed sensor employing a first embodiment of the present invention.

Referring to FIGS. 1 and 2, an embodiment of the present invention applied to a speed sensor for an automobile will be described.

As shown in FIG. 2, an annular support member 3 for rotatably supporting a fitting ring 2 having a threaded portion on its inner periphery is fixed by caulking to the left-hand side inner peripheral portion of a roughly cylindrical stator case 1. A first rotary shaft 4 has a stopper projection 5 on the left-hand side and a roughly flat rectangular coupling protrusion 6 on the right-hand, or coupling, side (FIG. 1). The left end of the first rotary shaft is inserted into and fixed to the driven gear of a transmission for an automobile. A second rotary shaft 7 has a collar 8 roughly in the center thereof, the left-hand, or coupling, side of the collar being slightly smaller in diameter than the right-hand side thereof. The second rotary shaft 7 has a slit-like coupling recess 9 formed in the coupling end of the shaft. The coupling recess 9 is adapted to receive the coupling protrusion 6, and the right-hand side thereof having a larger diameter is rotatably supported in the aforesaid case 1 through a bearing 10. Moreover, a fitting hole 11 having a stopper groove 11a is formed on the right-hand side of the second shaft 7 and one end of a speedometer cable (not shown) is to be fitted and coupled into the fitting hole 11.

As shown in FIG. 1, a V-shaped guide means 12 is formed on the coupling end where the coupling recess 9 of the rotary shaft 7 is formed. The coupling recess 9 has two opposing inner faces 12a, 12a, the planes of which are tilted in directions opposite to each other (intersecting as viewed from the side) relative to the axis of shaft 7. The coupling protrusion 6 of the first rotary shaft 4 is caused to slide on the tilted faces 12a of the guide means 12 while abutting thereagainst. The second rotary shaft 7 is turned in the direction of an arrow A in FIG. 1, whereby the coupling protrusion 6 is led to the coupling recess 9. As shown in FIG. 2, a plastic cylindrical support 13 having a collar 13a is integrally and rotatably fitted to the left-hand side outer peripheral portion of the second rotary shaft 7 and an annular permanent magnet 14 is fixed to the right-hand side outer peripheral portion thereof. A magnetic sensor element 15 is arranged in the position opposite to the permanent magnet 14 in the outer peripheral portion of the case 1. The magnetic sensor 15 is used to detect changes in polarity resulting from the rotation of the permanent magnet 14 as a speed signal and to supply the speed signal, through a cable 16, to an auto door lock, power steering unit, digital speed meter, mission control computer, and the like. A speed sensor 17 is thus constructed.

The following describes the operation where the aforesaid speed sensor is incorporated in the transmission (not shown). The first rotary shaft 4 is inserted into and fixed to the driven gear (not shown) and the speed meter cable is fitted into the fitting hole 11 of the second rotary shaft 7. Then the speed sensor 17 is incorporated into the transmission, i.e., the fitting ring 2 is fitted and affixed to the transmission. At this time, the coupling protrusion 6 of the first rotary shaft 4 is caused to abut against a tilted face 12a of the guide means 12 of the second rotary shaft 7. When the fitting ring 2 is then rotated and screwed onto the transmission, the first and second rotary shafts 4, 7 are moved in the axial direction so as to bring them together. As the first rotary shaft is mated with the driven transmission gear, it is not rotated. The coupling protrusion 6 is caused to slide on the tilted faces 12a and the second rotary shaft 7 is automatically rotated in the direction of arrow A. Consequently, the coupling protrusion 6 is led into the coupling recess 9 of the second rotary shaft as it slides on one of the tilted faces 12a, so that the coupling protrusion 6 is fitted into and coupled to the coupling recess 9.

In the embodiment described above, the guide means 12 is provided on the coupling end of the second rotary shaft where the coupling recess 9 is formed, and is used to lead the coupling protrusion 6 into the coupling recess 9. Consequently, it is not necessary to manually register the rotational positions of the coupling protrusion 6 and the recess 9 when they are fitted and coupled, whereby the assembly operation can be facilitated.

Figure 3:
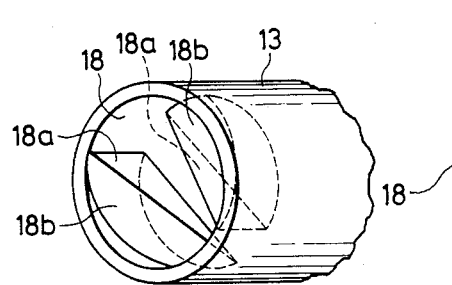
FIG. 3 perspective view of a guide means used in a second embodiment of the present invention.
Figure 4:
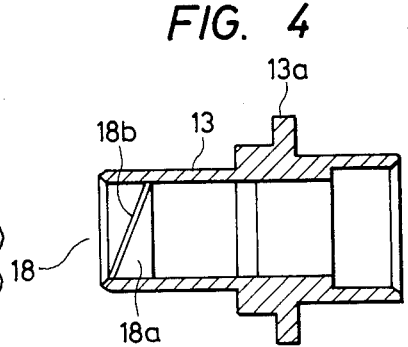
FIG. 4 is a sectional view of the guide means of FIG. 3.
Figure 5:
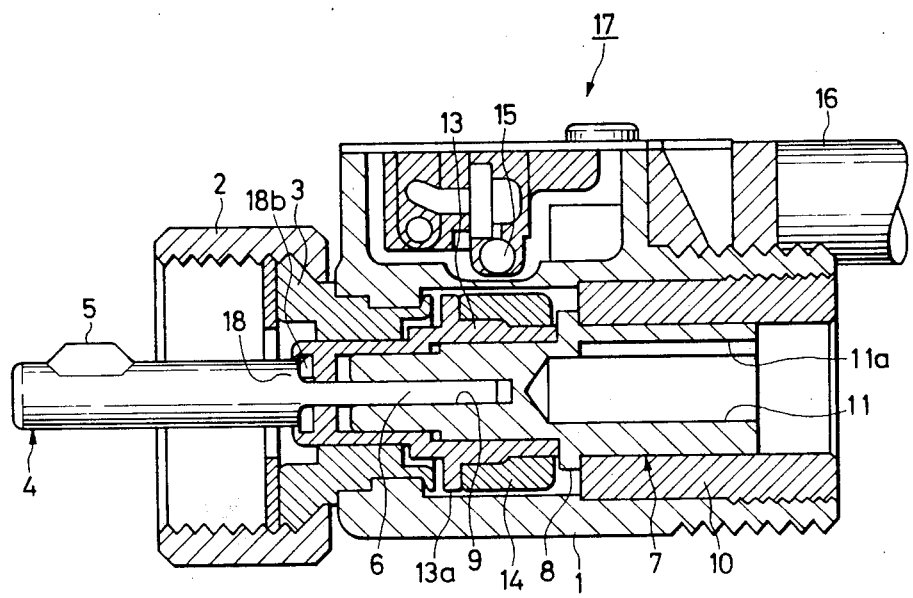
FIG. 5 is a sectional view of a speed sensor employing a second embodiment of the present invention.

FIGS. 3, 4 and 5 show a second embodiment of the present invention which is described below. The left, or coupling end, of a second rotary shaft 7 is formed with a flat extension. Guide means 18 is (in lieu of the guide means 12) formed in the left-hand side inner peripheral portion of a cylindrical support member 13 which is fitted onto the flat extension. The guide means 18 has walls 18a, 18a forming a V-shaped slit corresponding to the coupling recess 9 of the second rotary shaft 7 and tilted inner faces 18b, 18b similar to the tilted faces 12a, 12a. In this case, the cylindrical support member 13 is stopped by a stopper (not shown) in such a manner that the slit of the guide means 18 corresponds to the coupling recess of the second rotary shaft 7 and is fitted onto the second rotary shaft.

As shown in FIGS. 4 and 5 the guide means 18 may be formed in the plastic cylindrical support member 13.

In the production operation this second embodiment of the invention is used similarly to the operation described with respect to the first embodiment for incorporating a speed sensor in a transmission.

Although a reference has been made to the fixed first rotary shaft 4 in the aforesaid embodiments, the present invention is not limited to such applications and, for instance, the second rotary shaft may be non-rotatable, or otherwise the first and second rotary shafts may each be freely and independently rotatable.

Referring FIGS. 6, 7 and 8, a third embodiment of the present invention applied to an automobile speed sensor will be described. In the drawings, like reference characters designate like or corresponding parts of the first embodiment.

Figure 6:
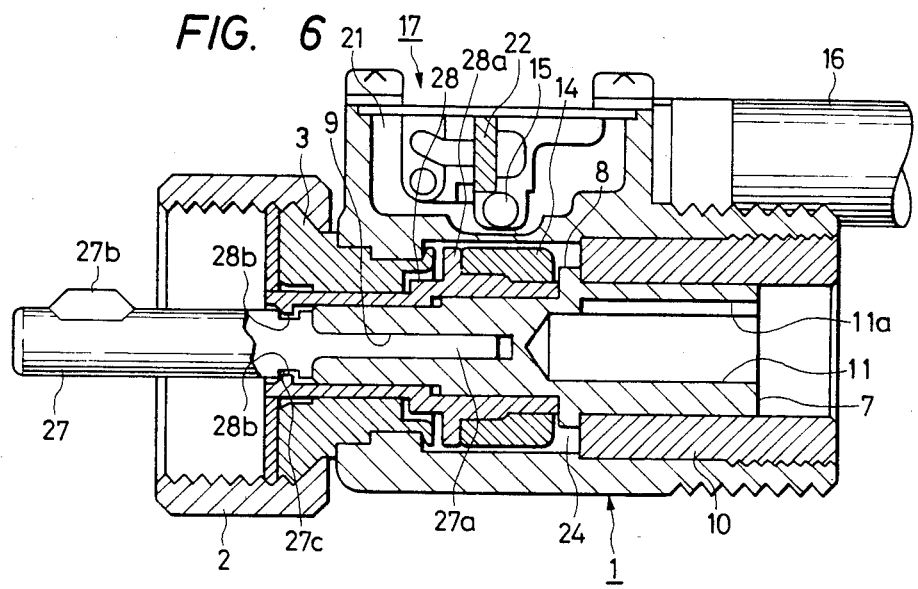
FIG. 6 is a sectional view of a speed sensor employing a third embodiment of the present invention.

As shown in FIG. 6, numeral 24 designates a rotor having a second rotary shaft 7 which is rotatably installed in a stator case 1. A bearing 10 supports the right-hand side large diameter portion 11a of the second rotary shaft 7.

A first rotary shaft 27 is provided with a roughly flat, rectangular coupling projection 27a on the right-hand or coupling, end (FIG. 8) and a stopper protrusion 27b at the left-hand end. The coupling projection 27a of the first rotary shaft 27 is fitted and coupled to the coupling recess 9 of the second rotary shaft 7 detachably and flexibly, whereas the other end where a stopper protrusion 27b is formed is fitted into and fixed to the driven gear of, e.g., an automobile transmission (not shown) as a rotary body being examined. Numeral 28 designates a resilient cylindrical member made, for example, of a plastic material having suitable strength and elasticity and which is fitted on the front, or coupled, end of the second rotary shaft 7 so as to cover the end portions of the second rotary shaft 7 and the first rotary shaft 27 when coupled together. A collar 28a is formed on the right-hand portion of the outer periphery of the cylindrical support member 28. An annular permanent magnet 14 is fitted and affixed to the right-hand end of the cylindrical member 28 and also to the rotor, so that it is positioned between the collar 28a and the collar 8 of the second rotary shaft 7.

In a recess 21 of the cylindrical case 1 there is contained a printed circuit board 22 equipped with electronic parts.

Figure 7:
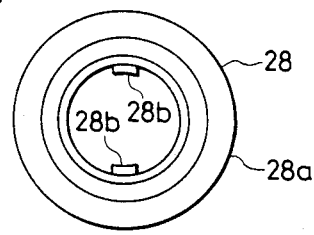
FIG. 7 is an end view of the cylindrical support member of FIG. 6.
Figure 8:
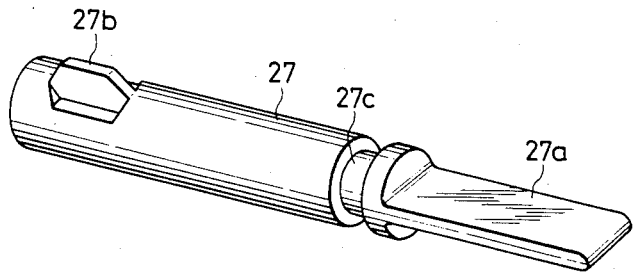
FIG. 8 a perspective view of a first rotary shaft shown in FIG. 6.

As shown in FIG. 7, the cylindrical member 28 has, e.g., two mating protrusions 28b, 28b in its front (coupling side) inner peripheral portion which extend inwardly toward the rotational axis of the shaft 27. The first rotary shaft 27 has, as shown in FIG. 8, an annular groove 27c on its surface for receiving the mating protrusions 28b. As shown, the annular groove 27c is located opposite the mating protrusions 28b of the cylindrical member 28 on the outer periphery of shaft 27 and serves as a stopper to prevent axial movement of the shaft 27 when it is coupled to shaft 7. The mating protrusions 28b of the cylindrical member 28 are fitted into the annular groove 27c of the first rotary shaft 27 and used to integrally hold together the second and first rotary shafts 7 and 27, respectively, and prevent their separation. The speed sensor 17 is thus constructed.

According to the third embodiment of the present invention, when the speed sensor 17 is fitted to the transmission by inserting and affixing the first rotary shaft 27 to the driven gear and bonding the fitting ring 2 to the transmission, the first rotary shaft 27 and the second rotary shaft 7 can be coupled detachably and flexibly even though the first rotary shaft 27 is off-center relative to the second rotary shaft 7. The eccentricity is absorbed in that portion of the coupling where both the rotary shafts 7, 27 are coupled. The second rotary shaft 7 is axially aligned into the stator case 1 and, while the first rotary shaft 27 may rotate eccentrically, it is prevented from abnormally wearing off. Moreover, the mating protrusions 28b on the cylindrical member 28 and the annular groove 27c on the first rotary shaft 27 are so engaged with each other as to maintain the engagement of the second and first rotary shafts 7, 27, although they are flexibly and detachably coupled. Consequently, when both the first and second rotary shafts, 27, 7 are assembled together, they are prevented from readily disengaging. Furthermore, even though the rotary shaft of the rotor 24 is constituted by the first rotary shaft 27 and the second rotary shaft 7, the assembly is free from deterioration.

As set forth above, the rotary shaft coupling device according to the present invention comprises a first rotary shaft having a flat coupling protrusion extending from the coupling end, a second rotary shaft having a coupling recess in the coupling end thereof which is in the form of a slit into which the coupling protrusion is fitted, and a guide means provided on the coupling end of the secondary rotary shaft where the coupling recess thereof is formed. The guide means is tilted with respect to the longitudinal axis of the second rotary shaft so as to guide the coupling protrusion into the coupling recess, so that registering the fitting positions of the coupling protrusion and recess of the first and second rotary shafts becomes unnecessary, thus resulting in an excellent assembly.

As is obvious from the description of the embodiments of the present invention, the rotary shaft coupling device according to the present invention comprising the rotor having the second rotary shaft rotatably installed in he stator case and the first rotary shaft with the coupling end thereof detachably and flexibly fitted and coupled to the second rotary shaft, has a resilient cylindrical member attached to the second rotary shaft so as to cover the end portions of the first and second rotary shafts when they are fitted and coupled to each other. A mating projection is formed in the inner periphery of the coupling end of the cylindrical member, and a stopper recess receives and engages the mating projections in the outer periphery of the first rotary shaft opposite to the mating projection. Accordingly, even though the first rotary shaft is off-center relative to the stator case when it is fitted thereto, abnormal wear of the rotary shaft is reduced.

Having described preferred embodiments of the present invention, it will be recognized that variations and modifications thereof falling within the scope of the appended claims will become apparent to one skilled in the art.

What is claimed is:

1. A rotary shaft coupling device comprising:
 a first rotary shaft having a coupling end and a coupling protrusion extending from the coupling end;
 a second rotary shaft having a coupling end and a coupling recess in the coupling end therefor into which said coupling protrusion is fitted;
 a fitting ring member adjacent the coupling end of said second rotary shaft, said ring member being adapted for being threadedly mounted into a transmission of a vehicle; and
 a V-shaped guide means on the coupling end of said second rotary shaft where said coupling recess is formed, said guide means having opposing inner faces disposed at an angle relative to the axis of said second rotary shaft to guide the coupling protrusion into said coupling recess when said shafts are fitted and coupled together.

2. The device of claim 1, wherein said protrusion is a flat member and said guide means is a V-shaped slit.

3. The device of claim 2, wherein said guide means is formed on the coupling end of said second shaft.

4. The device of claim 2, further including a cylindrical support member fitted on said second shaft, and said guide means is formed on the coupling end of said cylindrical support member.

5. The device of claim 2, further including a cylindrical support member on the coupling end of said second shaft, a magnet affixed to said cylindrical support member to rotate therewith, and wherein said guide means is formed in the coupling end of said cylindrical support member.

6. The device of claim 4, wherein said cylindrical support member is formed of a resilient plastic material.

7. The device of claim 6, wherein said resilient cylindrical support member covers the coupling ends of said first and second shafts when coupled together, and further includes a mating projection formed on the inner periphery of the coupling end of said cylindrical member, and a stopper recess on the outer periphery of said first shaft member opposite said mating projection for receiving said mating projection and maintaining the engagement of said first and second shafts.

8. A rotary shaft coupling device comprising:
 a stator case;
 a rotor having a second rotary shaft rotatably installed in said stator case;
 a permanent magnet fitted onto said rotor;
 a magnetic detection element installed opposite said permanent magnet in said stator case;
 a first rotary shaft with one end detachably and flexibly fitted and coupled to said second rotary shaft;
 a resilient cylindrical member attached to said second rotary shaft and having a coupling end for covering the coupled ends of said first and second rotary shafts;
 a mating projection formed on the inner periphery of the coupling end of said cylindrical member; and
 a stopper recess for receiving said mating projection formed on the outer periphery of said first rotary shaft opposite to said mating projection.

9. A rotary shaft coupling device comprising:

a first rotary shaft having a coupling end and a flat coupling protrusion extending from the coupling end;

a second rotary shaft having a coupling end and a coupling recess in the coupling end thereof into which said coupling protrusion is fitted;

a V-shaped guide means on the coupling end of said second rotary shaft where said coupling recess is formed, said guide means having opposing inner faces disposed at an angle relative to the axis of said second rotary shaft to guide the coupling protusion into said coupling recess when said shafts are fitted and coupled together; and a cylindrical support member on the coupling end of said second shaft, a magnet affixed to said cylindrical support member to rotate therewith, and wherein said guide means is formed in the coupling end of said cylindrical support member.

* * * * *